R. Leitch,
Stop Cock,
N° 36,222.   Patented Aug. 19, 1862.
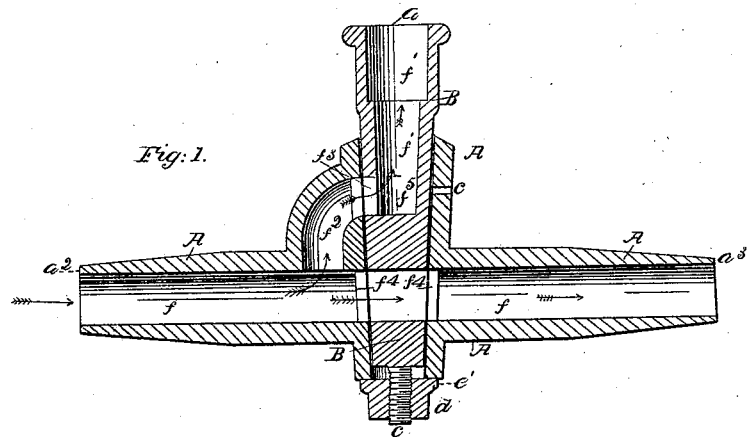
Fig: 1.
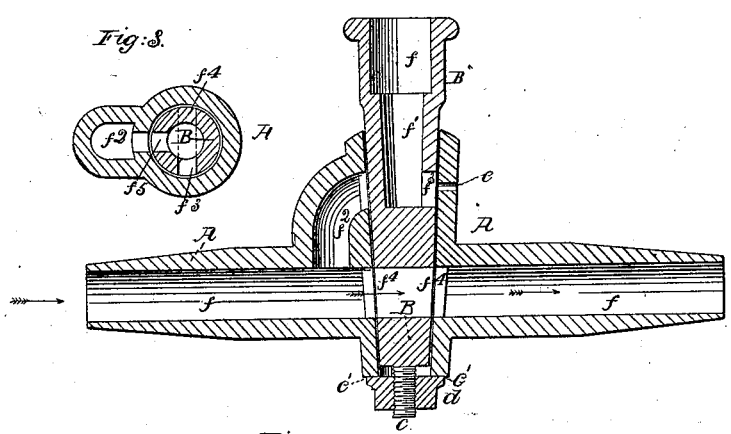
Fig: 2.
Fig: 3.
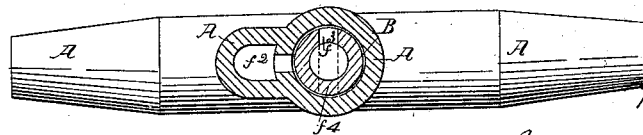
Fig: 4.
Witnesses:
Gustavus Dietrich
Edwin S. Jacob
Inventor:
Robert Leitch
by
Mason Fenwick & Lawrence
atty

UNITED STATES PATENT OFFICE.

ROBERT LEITCH, OF BALTIMORE, MARYLAND.

IMPROVEMENT IN TWO-WAY STOP-COCKS.

Specification forming part of Letters Patent No. 36,222, dated August 19, 1862.

*To all whom it may concern:*

Be it known that I, ROBERT LEITCH, of Baltimore, in the State of Maryland, have invented a new and Improved Stop-Cock for Street and Dwelling Purposes; and I do hereby declare that the following is a full and exact description thereof, reference being had to the accompanying drawings, and to the letters of reference marked thereon, in which like letters designate the same parts, and in which drawings—

Figure 1 is a longitudinal vertical section showing the flow of water through the main passage of the stop-cock, and also through the main channel of the valve; Fig. 2, a like view showing the valve so turned as to cause the water to flow only through the main channel of the stop-cock; Fig. 3, a partial horizontal section showing the flow of water only through that portion of the main channel of the stop-cock which is between the valve and the fountain-head, and also through the main channel of the valve; and Fig. 4, a partial horizontal section and plan with the valve so turned as to entirely cut off the flow of water through my stop-cock for street and dwelling purposes.

The nature of my invention consists in so constructing a stop-cock for street and dwelling purposes that the flow of the water may be equally divided, or nearly so, for use in the street and in a dwelling-house or other locality at one and the same time, or so that the full flow of the water may be used solely in the dwelling-house or other locality and not in the street, or so that the full flow of the water may be used solely in the street, or be cut off at the same time both from the street and the dwelling-house or other locality, as may be desired.

To effect this I construct the main portion A of my stop-cock of metal, in one piece, with a longitudinal main channel, $f f$, through the same, and with a vertical conical opening through its center to receive a valve, B, as shown in the figures. The valve B is provided with a vertical conical opening or channel, $f'$, commencing at its top $a$ and extending down nearly two-thirds its length, and so as to register, by means of slots or openings $f^3$ and $f^5$, with the channel $f^2$, which latter channel leads into the main channel $f f$ of the main portion A, as shown in the figures. This valve is cast of metal, in one piece, and at its bottom terminates in a screw-shank, $c$, fitted to receive a screw-nut, $d$, so that when the nut $d$ is "screwed up" the top of the nut will abut against the shoulder $e'$ of the main portion A and thus draw the valve down firmly and snugly into its seat. The lower portion of the valve has a vertical slot or opening cut through it, as at $f^4$, which slot registers or communicates with the main channel $f f$ of the main portion A. Between the point $a^2$ and the valve B, and adjoining the valve, it will be observed that the main portion A of my stop-cock is enlarged, as shown, so as to permit of a passage or channel, $f^2$, for the flow of the water from a portion of the main channel $f$ into the channel $f'$ of the valve B; and, as before stated, vertical slots or openings $f^3$ and $f^5$ are made, or may be made, in the valve B, so as to connect the vertical conical opening $f'$ of the valve with the channel $f^2$. As shown clearly in Fig. 2, a vent-hole, $e$, is provided to allow of the water to waste out of the vertical opening $f'$ of the valve B, when desired.

With my apparatus thus constructed, one of its ends, $a^2$, being secured to a pipe leading to the fountain-head and its opposite end, $a^3$, connected with a pipe leading to a dwelling or other locality, and with a hose connected to the top $a$ of the valve B, I am enabled to wash the street at the same time the dwelling is supplied with water, as shown in Fig. 1; or the water may be cut off from the street and only supplied to the dwelling, as shown in Fig. 2; or the water may be cut off from the dwelling and only supplied to the street, as shown in Fig. 3; or the water may be entirely cut off both from the dwelling and the street, as shown in Fig. 4.

Having thus described my stop-cock for street and dwelling purposes, what I claim as new, and desire to secure by Letters Patent of the United States, is—

A stop-cock for street and dwelling purposes constructed and operating substantially in the manner and for the purpose set forth.

Witness my hand and seal, in the matter of my application for a patent for a stop-cock for street and dwelling purposes, this 16th day of April, A. D. 1862.

ROBERT LEITCH. [L. S.]

Witnesses:
BENJ. F. NALLS,
J. NELSON FOSTER.